United States Patent
Burt et al.

(10) Patent No.: US 9,953,163 B2
(45) Date of Patent: Apr. 24, 2018

(54) SYSTEM AND METHOD FOR DETECTION OF MALICIOUS HYPERTEXT TRANSFER PROTOCOL CHAINS

(71) Applicant: Cyphort Inc., Santa Clara, CA (US)

(72) Inventors: Alexander Burt, San Jose, CA (US); Mikola Bilogorskiy, Sunnyvale, CA (US); McEnroe Navaraj, Santa Clara, CA (US); Frank Jas, Scotts Valley, CA (US); Liang Han, Pleasanton, CA (US); Yucheng Ting, Milpitas, CA (US); Manikandan Kenyan, Saratoga, CA (US); Fengmin Gong, Livermore, CA (US); Ali Golshan, Santa Clara, CA (US); Shishir Singh, Cupertino, CA (US)

(73) Assignee: Cyphort Inc., Santa Clara, CA (US)

( * ) Notice: Subject to any disclaimer, the term of this patent is extended or adjusted under 35 U.S.C. 154(b) by 0 days.

(21) Appl. No.: 14/627,686

(22) Filed: Feb. 20, 2015

(65) Prior Publication Data
US 2015/0242628 A1 Aug. 27, 2015

Related U.S. Application Data

(60) Provisional application No. 61/943,492, filed on Feb. 23, 2014.

(51) Int. Cl.
*H04L 29/06* (2006.01)
*G06F 21/56* (2013.01)

(52) U.S. Cl.
CPC .......... *G06F 21/566* (2013.01); *H04L 63/145* (2013.01); *H04L 63/1441* (2013.01); *G06F 2221/034* (2013.01)

(58) Field of Classification Search
CPC ...... G06F 21/554; G06F 21/56; G06F 21/562; G06F 21/566; G06F 21/577;
(Continued)

(56) References Cited

U.S. PATENT DOCUMENTS 8,448,241 B1 * 5/2013 Kadakia ............. G06F 11/3688
726/22
8,683,584 B1 * 3/2014 Daswani ............. G06F 21/577
726/22

(Continued)

FOREIGN PATENT DOCUMENTS

WO 2013/184653 A1 12/2013

OTHER PUBLICATIONS

International Search Report and Written Opinion for International Application No. PCT/US2015/017154, dated Jun. 10, 2015.

*Primary Examiner* — Minh Dinh
(74) *Attorney, Agent, or Firm* — Harrity & Harrity, LLP

(57) ABSTRACT

A system configured to detect malware is described. The system configured to detect malware including a data collector configured to detect at least a first hypertext transfer object in a chain of a plurality of hypertext transfer objects. The data collector further configured to analyze at least the first hypertext transfer object for one or more events. And, the data collector configured to generate a list of events based on the analysis of at least the first hypertext transfer object.

25 Claims, 4 Drawing Sheets

(58) Field of Classification Search
CPC ............. G06F 2221/2119; H04L 63/02; H04L 63/0281; H04L 63/145; H04L 63/1483
See application file for complete search history.

(56) References Cited

U.S. PATENT DOCUMENTS

| | | | |
|---|---|---|---|
| 8,752,183 B1* | 6/2014 | Heiderich | G06F 21/577 726/22 |
| 2004/0073811 A1 | 4/2004 | Sanin | |
| 2009/0158430 A1 | 6/2009 | Borders | |
| 2011/0083180 A1 | 4/2011 | Mashevsky et al. | |
| 2011/0179484 A1 | 7/2011 | Tuvell et al. | |
| 2012/0260338 A1* | 10/2012 | Freeman | G06F 21/566 726/22 |
| 2012/0324582 A1* | 12/2012 | Park | H04L 63/1433 726/25 |
| 2013/0055399 A1 | 2/2013 | Zaitsev | |
| 2013/0191469 A1 | 7/2013 | Dichiu et al. | |
| 2013/0263270 A1 | 10/2013 | Cote et al. | |
| 2013/0318568 A1 | 11/2013 | Mahaffey et al. | |
| 2014/0189864 A1* | 7/2014 | Wang | G06F 21/51 726/23 |

* cited by examiner

SYSTEM AND METHOD FOR DETECTION OF MALICIOUS HYPERTEXT TRANSFER PROTOCOL CHAINS

CROSS-REFERENCE TO RELATED APPLICATIONS

This application claims priority from U.S. Provisional Patent Application No. 61/943,492, filed on Feb. 23, 2014, which is hereby incorporated by reference in its entirety.

FIELD

Embodiments of the invention relate to protecting computers and networks from malicious software. In particular, embodiments of the invention relate to a system and method for detection of hypertext transfer protocol chains.

BACKGROUND

As computer networks grow and the amount of data stored on computers and databases interconnected by those networks grows, so have attempts to gain unauthorized access to these computers and databases. Such attempts to gain unauthorized access to computers and databases may include methodical reconnaissance of potential victims to identify traffic patterns and existing defenses. A technique used to gain unauthorized access to computers and databases includes loading malicious software or malware onto a computer. Such malware is designed to disrupt computer operation, gather sensitive information, or to grant access to the computer to unauthorized individuals.

As the awareness of malware increases, the techniques used to load malware onto computers (also called a malware infection) has grown more sophisticated. As a result, legacy security solutions that use a structured process (e.g., signature and heuristics matching) or analyze agent behavior in an isolated context fail to detect sophisticated techniques to load malware. For example, a malware infection may now take multiple steps to redirect a computer to different websites to prevent reputation checking from detecting the infection and use different types of obfuscation and encryption to further prevent pattern matching from detecting the infection.

The failure to detect the loading of malware and sophisticated malware on a computer or network can result in loss of high value data, down time or destruction of infected computers and/or the networks, lost productivity, and a high cost to recover and repair the infected computers and/or networks.

SUMMARY

A system configured to detect malware is described. The system configured to detect malware including a data collector configured to detect at least a first hypertext transfer object in a chain of a plurality of hypertext transfer objects. The data collector further configured to analyze at least the first hypertext transfer object for one or more events. And, the data collector configured to generate a list of events based on the analysis of at least the first hypertext transfer object.

Other features and advantages of embodiments will be apparent from the accompanying drawings and from the detailed description that follows.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of a system to detect malware are configured to detect a chain of hypertext transfer ("HTTP") objects or HTTP chain used to download malware. For example, embodiments include a system and methods for detection of HTTP chains that infect an end user device by redirecting the end user device to one or more websites, exploiting one or more software vulnerabilities of the end user device, and installing one or more malicious software (malware objects) on the end user device. A chain of HTTP objects is a sequence of HTTP objects related to each other, for example one HTTP object may include one or more references including, but not limited to, a link to, a call to, or otherwise reference to another HTTP object. A number of HTTP chains will be downloaded, for example, when a user accesses a uniform resource identifier ("URI"), such as a uniform resource locator ("URL"), in a user application, such as a web browser. In this example, the URI is the root of an HTTP chain. The web browser based on the URI will download an HTTP object that references another HTTP object. As a result, the web browser will download the next HTTP object in the chain referenced in the first downloaded HTTP object. The web browser will recursively download the next HTTP object in the chain once the web browser parses the current HTTP object downloaded.

Such HTTP chains may be used to attract a user to a web site having a URL that is not known to be associated with malware and then references in the HTTP object to another URL that results in the web browser downloading malware or a portion thereof. Because the initial URL is not known to be associated with malware, legacy security solutions would not detect the threat. Further, the capability to chain many HTTP objects together through references to other HTTP objects provides the ability to split up the malware into many parts, and to apply transformation or encryption, in order to obscure the downloading of the malware. Legacy software solutions will fail to detect this threat.

Systems and methods according to embodiments are configured to detect one or more HTTP objects in an HTTP chain and analyze the HTTP objects for one or more events. Upon detection of these events, a list is generated to store the events determined based on the analysis. The system and methods may also be configured to make other determinations based on information contained in one or more of the HTTP objects in an HTTP chain. The list of events and/or the other determinations may be used for detection of malware and/or generation of data models to detect malware. The list of events and/or other determinations may also be used to prevent downloading of malware.

Figure 1:
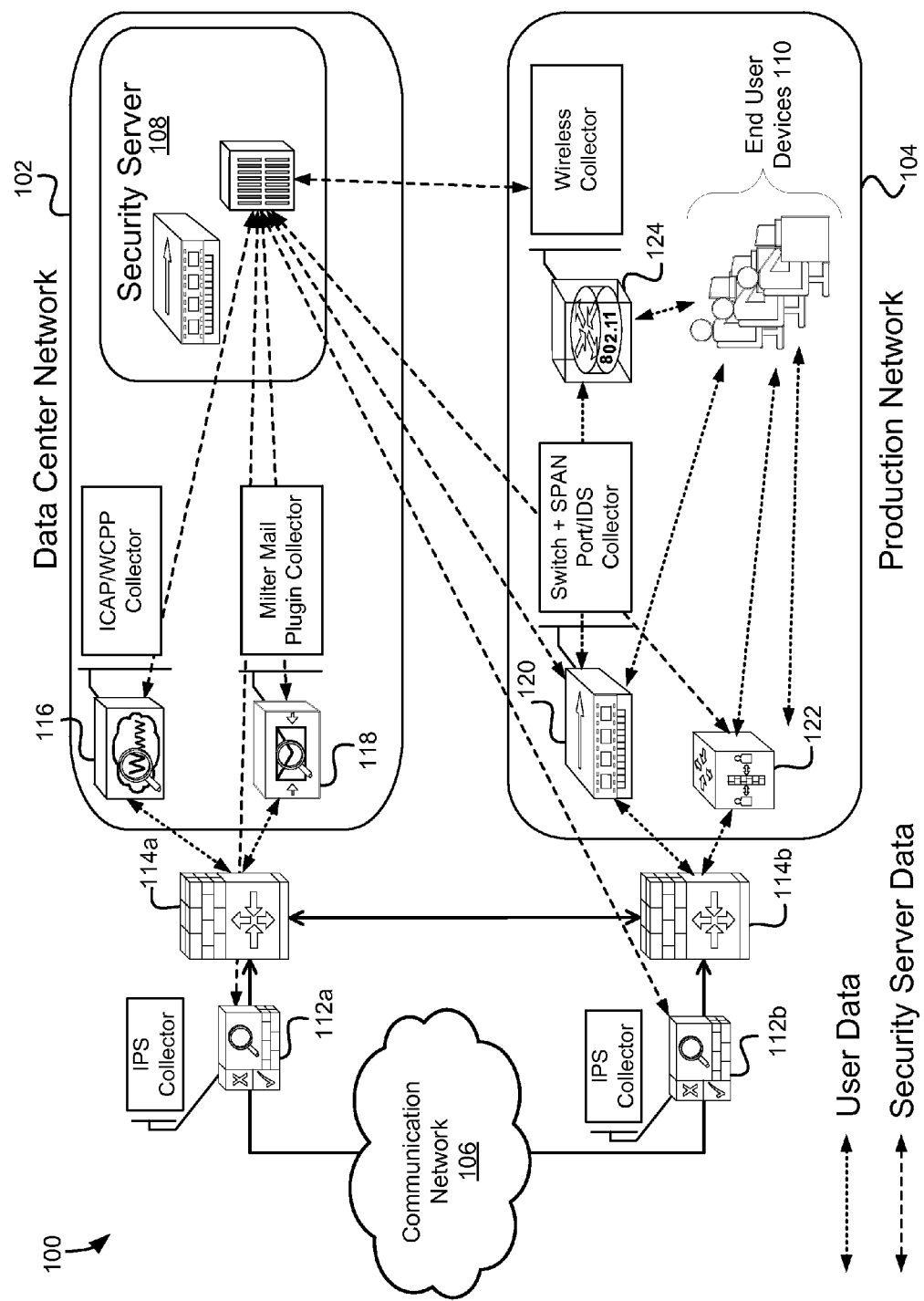
FIG. 1 illustrates a block diagram of a network environment that includes a system configured to detect malware according to an embodiment.
Figure 3:
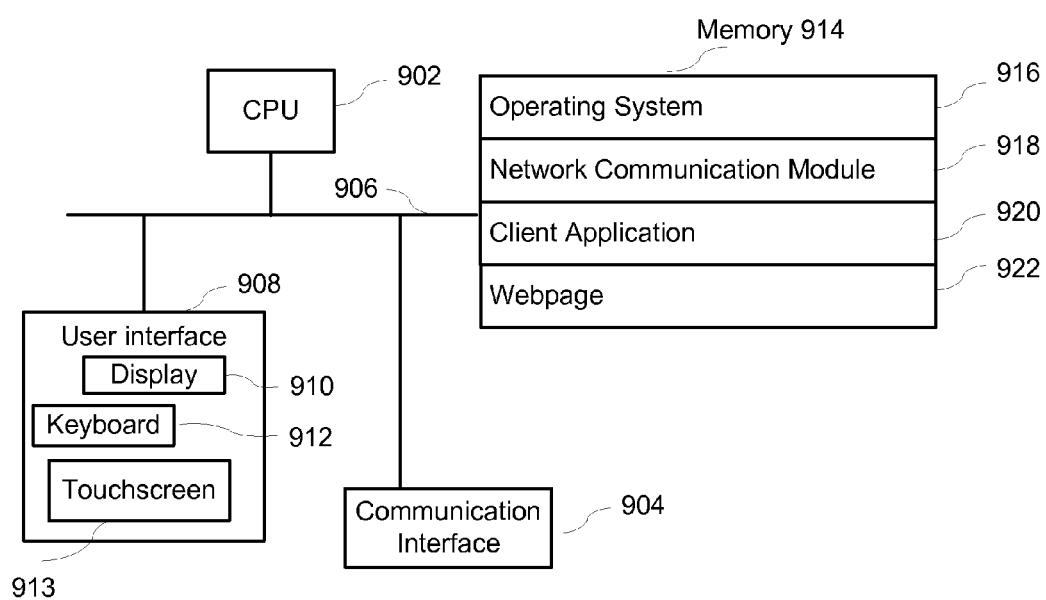
FIG. 3 illustrates an embodiment of a client according to an embodiment.

FIG. 1 illustrates a block diagram of a network environment 100 that includes a system configured to detect malware according to an embodiment. Systems and methods embodied in the network environment 100 may detect malicious activity, identify malware, identify exploits, take preventive action, generate signatures, generate reports, determine malicious behavior, determine targeted information, recommend steps to prevent attack, and/or provide recommendations to improve security. The network environment 100 comprises a data center network 102 and a production network 104 that communicate over a communication network 106. The data center network 102 comprises a security server 108. The production network 104 comprises a plurality of end user devices 110. The security server 108 and the end user devices 110 may comprise digital devices. A digital device is any device with a processor and memory. An embodiment of a digital device is depicted in FIG. 3.

The security server 108 is a digital device configured to identify malware and/or suspicious behavior by running virtualized and emulated environments and monitoring behavior of suspicious data within the virtualized and emulated environments. In various embodiments, the security server 108 receives suspicious data from one or more data collectors. The data collectors may be resident within or in communication with network devices such as Intrusion Prevention System (IPS) collectors 112a and 112b, firewalls 114a and 114b, ICAP/WCCP collectors 116, milter mail plug-in collectors 118, switch collectors 120, and/or access points 124. Those skilled in the art will appreciate that a collector and a network device may be two separate digital devices (e.g., see F/W collector and IDS collector).

In various embodiments, data collectors may be at one or more points within the communication network 106. A data collector, which may include a tap or span port (e.g., span port IDS collector at switch 120) for example, is configured to intercept network data from a network. The data collector may be configured to identify suspicious data. Suspicious data is any data collected by the data collector that has been flagged as suspicious by the data collector and/or any data that is to be processed within the virtualization environment.

The data collectors may filter the data before flagging the data as suspicious and/or providing the collected data to the security server 108. For example, the data collectors may filter out plain text but collect executables or batch files. Further, in various embodiments, the data collectors may perform intelligent collecting. For example, data may be hashed and compared to a whitelist. The whitelist may identify data that is safe. In one example, the whitelist may identify digitally signed data or data received from a known trusted source as safe. Further, the whitelist may identify previously received information that has been determined to be safe. If data has been previously received, tested within the environments, and determined to be sufficiently trustworthy, the data collector may allow the data to continue through the network. Those skilled in the art will appreciate that the data collectors (or agents associated with the data collectors) may be updated by the security server 108 to help the data collectors recognize sufficiently trustworthy data and to take corrective action (e.g., quarantine and alert an administrator) if untrustworthy data is recognized. In some embodiments, if data is not identified as safe, the data collectors may flag the data as suspicious for further assessment.

Those skilled in the art will appreciate that one or more agents or other modules may monitor network traffic for common behaviors and may configure a data collector to collect data when data is directed in a manner that falls outside normal parameters. For example, the agent may determine or be configured to appreciate that a computer has been deactivated, a particular computer does not typically receive any data, data received by a particular computer typically comes from a limited number of sources, or a particular computer typically does not send data of a given pattern to certain destinations. If data is directed to a digital device in a manner that is not typical, the data collector may flag such data as suspicious and provide the suspicious data to the security server 108.

Network devices include any device configured to receive and provide data over a network. Examples of network devices include, but are not limited to, routers, bridges, security appliances, firewalls, web servers, mail servers, wireless access points (e.g., hotspots), and switches. In some embodiments, network devices include IPS collectors 112a and 112b, firewalls 114a and 114b, Internet content adaptation protocol (ICAP)/web cache communication protocol (WCCP) servers 116, devices including milter mail plug-ins 118, switches 120, and/or access points 124. The IPS collectors 112a and 112b may include any anti-malware device including IPS systems, intrusion detection and prevention systems (IDPS), or any other kind of network security appliances. The firewalls 114a and 114b may include software and/or hardware firewalls. In some embodiments, the firewalls 114a and 114b may be embodied within routers, access points, servers (e.g., web servers), mail filters, or appliances.

ICAP/WCCP servers 116 include any web server or web proxy server configured to allow access to a network and/or the Internet. Network devices including milter mail plug-ins 118 may include any mail server or device that provides mail and/or filtering functions and may include digital devices that implement milter, mail transfer agents (MTAs), sendmail, and postfix, for example. Switches 120 include any switch or router. In some examples, the data collector may be implemented as a TAP, SPAN port, and/or intrusion detection system (IDS). Access points 124 include any device configured to provide wireless connectivity with one or more other digital devices.

The production network 104 is any network that allows one or more end user devices 110 to communicate over the communication network 106. The communication network 106 is any network that may carry data (encoded, compressed, and/or otherwise) from one digital device to another. In some examples, the communication network 106 may comprise a LAN and/or WAN. Further, the communication network 106 may comprise any number of networks. In some embodiments, the communication network 106 is the Internet.

FIG. 1 is exemplary and does not limit systems and methods described herein to the use of only those technologies depicted. For example, data collectors may be implemented in any web or web proxy server and is not limited to only the servers that implement ICAP and/or WCCP. Similarly, collectors may be implemented in any mail server and is not limited to mail servers that implement milter. Data collectors may be implemented at any point in one or more networks.

Those skilled in the art will appreciate that although FIG. 1 depicts a limited number of digital devices, collectors, routers, access points, and firewalls, there may be any kind and number of devices. For example, there may be any number security servers 108, end user devices 110, IPS collectors 112a and 112b, firewalls 114a and 114b, ICAP/WCCP collectors 116, milter mail plug-ins 118, switches 120, and/or access points 124. Further, there may be any number of data center networks 102 and/or production networks 104.

Figure 2:
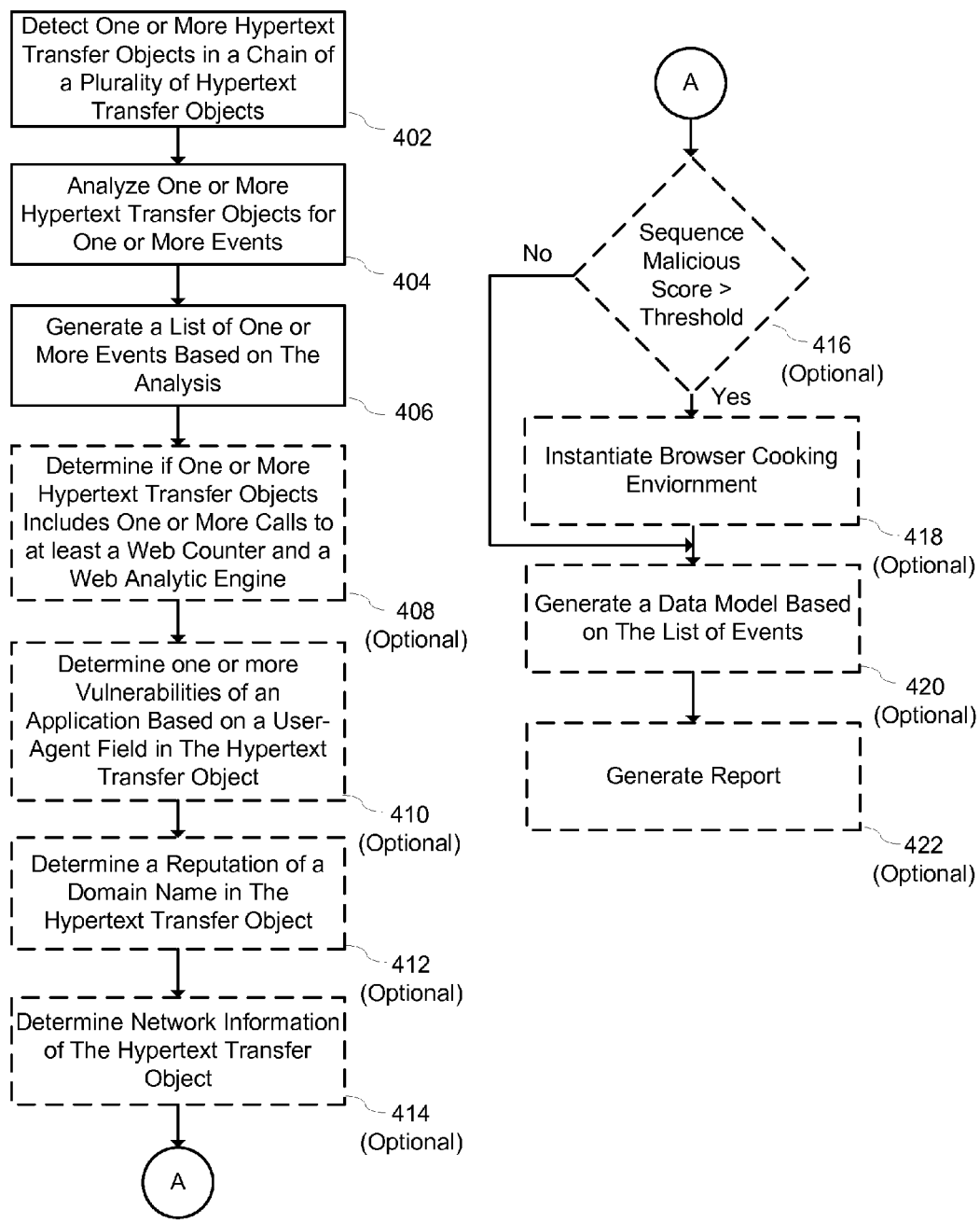
FIG. 2 illustrates a flow diagram for detecting malware according to an embodiment.

FIG. 2 illustrates a block diagram of a method to detect HTTP chains according to an embodiment. The method includes detecting one or more HTTP objects in a chain of a plurality of HTTP objects (402). According to an embodiment, a data collector is configured to analyze communications between a server and a client to determine when a payload contains an HTTP object. For example, a data collector is configured to analyze communication packets between a client and a server for an address and/or a port number. If an address and/or port number are found, the collector may then analyze the payload to determine if an HTTP object is contained based on a comparison of a bit pattern. Or, a data collector can be configured to recognize that HTTP objects are contained in the traffic by matching patterns for HTTP GET, HTTP POST, and other request methods, without relying on the specific protocol or port number.

The method also includes analyzing one or more HTTP object for one or more events (404). An HTTP object may include, but is not limited to, a header and a body. According to an embodiment, a collector is configured to analyze a header and/or a body of an HTTP object for one or more events. For example, a collector may analyze an HTTP object by performing a frequency analysis of a body of the HTTP object. A frequency analysis includes, but is not limited to, determining a correlation between different character types. Character types may include, but are not limited to, letters, numbers, groups of special characters, number of language blocks, and entropy calculations. Entropy calculation is a form a correlation of characters, measuring how likely a given sequence of characters would appear in normal HTTP objects.

Based on the analysis performed on the HTTP object, the method generates a list of one or more events (406). For example, a collector is configured to store any determined correlation between character types of one or more HTTP objects in the HTTP chain in a list. The analysis may also include determining a correlation between a URI and an HTTP body file type for one or more HTTP objects in an HTTP chain. For example, a known URI or group of URIs for distributing malware may use a specific HTTP body file type. According to an embodiment, a collector is configured to determine a correlation between a URI and an HTTP body file type by parsing an extracted HTTP object from a communication payload. For example, an HTTP header may indicate a file of type of ZIP archive (as .zip) while the actual file contained in the body be actually a Windows executable. Any determined correlation may then be stored on a list of events by the data collector.

The method may also optionally determine if one or more HTTP objects includes one or more calls to at least a web counter and a web analytic (408). For an embodiment, a data collector is configured to parse an HTTP object to determine if it includes a reference to a web counter and an analytic engine. Any determined reference to a web counter and/or web analytic engine is stored in the list of events in addition to other events for the HTTP object. Further, the method may optionally determine one or more vulnerabilities of an application used for communication based on a user-agent field in one or more HTTP objects in the HTTP chain (410). For an embodiment, a data collector is configured to parse the HTTP chain to obtain the value of the user-agent field in an HTTP object. The value of the user-agent field represents the application used for the communications on the client side. A data collector may then cross reference a list of known vulnerabilities for the application type used. The determined application type and/or the vulnerabilities may then be stored by the collector on the list of events.

The method may optionally determine a reputation of a domain name and/or URI in one or more of the HTTP objects in the HTTP chain (412). For an embodiment, a data collector is configured to parse an HTTP object for a domain name and/or an URI to determine the reputation. The reputation may be determined based on the systems past experiences with a domain name and/or URI for distributing malware or other behavior. The reputation may be determined based on determining that the domain name and/or URI are on a distributed list of known domain names and/or URIs. For an embodiment, a data collector is configured to add a domain name and/or URI found in the list of events for an HTTP chain upon determining its reputation.

The method optionally includes determining network information of one or more HTTP object in the HTTP chain (414). Network information includes, but is not limited to, an internet protocol address and a port number. For an embodiment, a data collector is configured to parse an HTTP object for network information. The data collector is further configured to add the network information to the list of events.

The method optionally includes determining if an HTTP chain is a suspicious sequence of HTTP objects based on a sequence malicious score for the HTTP chain. The sequence malicious score of the HTTP chain is compared to a configurable threshold (416); if it is greater than and/or equal to the threshold, a browser cooking environment is instantiated for further analysis (418). However, if the sequence malicious score is less than the threshold, the method does not instantiate a browser cooking environment.

A suspicious sequence of HTTP objects is determined based on a combination of specific file formats and http headers that can contain objects to attack an end user device. A particular combination of file formats and https headers within an HTTP chain will be determined to be a suspicions sequence based on information about both known and potential vulnerabilities for a particular environment (e.g., operating system ("OS"), browser, and plugins). For example, if an end user device is running a Windows® OS, a suspicious sequence can contain at least one java loader (html file), an exploit (java code), and a payload (e.g. encrypted EXE file). Thus, the more specific file formats and http headers of one or more types contained within an HTTP chain, a higher sequence malicious score is assigned to the HTTP chain. For example, a point or a weight is assigned for each instance of a file format and an HTTP header determined to be suspicious. The points are then added up at the end of analyzing the HTTP chain to generate a sequence malicious score. Further, an additional weight factor or point(s) may be assigned if a certain combination of any of the file formats and/or the HTTP headers are found within the HTTP chain.

According to one embodiment, a browser cooking environment (418) is instantiated using a virtualization environment that is configured with a version of a browser. A browser includes, but is not limited to, Internet Explorer®, Firefox®, and other applications used to access information over a network such as the Internet. The environment is instrumented to collect one or more of an execution log and a call trace during the browser operation using tools including those known in the art. The chain of the HTTP object is replayed to the browser starting from the root (start) object of the chain.

The method, according to an embodiment, uses at least two different ways to replay the sequence of HTTP objects to the browser cooker. In one technique, the detection system includes a web server and domain name system ("DNS") server. The system uses a firewall and a routing configuration to serve all requests from the browser cooker by redirecting the requests to the DNS server and the web server, and the HTTP server uses the saved HTTP objects from the suspicious sequence for responses to the browser cooker. In another technique, the detection system uses a web server and sets it as the HTTP proxy server in the browser settings for the browser cooker. This HTTP proxy server receives requests from the browser and sends responses with objects from saved sequence.

The method optionally includes generating a report (422). A report may be generated describing the malware, identify vulnerabilities, generate or update signatures for the malware, generate or update heuristics or statistics for malware detection, and/or generate a report identifying the targeted information (e.g., credit card numbers, passwords, or personal information). For example, the detection report can include, but is not limited to, the following information:
 file types involved in the HTTP chain;
 well known string patterns identifying exploits;
 obfuscation techniques used in scripts, such as decoding strings and executing the result as a program;
 activities and techniques gathering information in the environment on the end user device, e.g. probing, plugin enumeration, version check; and
 well known harmful exploit indicators such as special call sequences.

This type of information can be used to detect malware infection in multiple ways. In one implementation, a set of discrete signatures are created that cover both known and anticipated infection sequences as represented by indicators, such as those in the above list of indicators. After browser cooking, the list of information is collected and matched against a set of signatures. Any signature match results in a positive detection verdict. In another embodiment, the set of information is transformed into a set of machine learning features. One or more supervised machine learning models are trained using known sets of malicious and benign HTTP chains. With this embodiment, a set of feature values will be extracted from the list of information after browser cooking, and the machine learning models are applied to arrive at a detection verdict.

Further, the method optionally includes generating a data model based on the list of events for an HTTP chain (420). For an embodiment, a system is configured to determine if the HTTP chains are distributing malware and then use the list of events for the HTTP chains to generate a data model to recognize these HTTP chains. For example, a simple model can be a specific sequence of objects with iframes, javascripts, and encryption. The system is further configured to use the list of events from the HTTP chains and to match the events against the generated data models to prevent malware from being distributed by an HTTP chain. For example, a system is configured to use a machine-learning algorithm based on the generated data models to classify unknown HTTP chains as malicious, e.g., used to distribute malware or other malicious behavior, or clean. Applicable machine learning models include, but are not limited to SVM (supporting vector machine) or Liblinear.

FIG. 3 illustrates an embodiment of a client, user device, or digital device that includes one or more processing units (CPUs) 902, one or more network or other communications interfaces 904, memory 914, and one or more communication buses 906 for interconnecting these components. The client may include a user interface 908 comprising a display device 910, a keyboard 912, a touchscreen 913 and/or other input/output device. Memory 914 may include high speed random access memory and may also include non-volatile memory, such as one or more magnetic or optical storage disks. The memory 914 may include mass storage that is remotely located from CPUs 902. Moreover, memory 914, or alternatively one or more storage devices (e.g., one or more nonvolatile storage devices) within memory 914, includes a computer readable storage medium. The memory 914 may store the following elements, or a subset or superset of such elements:
 an operating system 916 that includes procedures for handling various basic system services and for performing hardware dependent tasks;
 a network communication module 918 (or instructions) that is used for connecting the client to other computers, clients, servers, systems or devices via the one or more communications network interfaces 904 and one or more communications networks, such as the Internet, other wide area networks, local area networks, metropolitan area networks, and other type of networks; and
 a client application 920 including, but not limited to, a web browser, a document viewer or other application for viewing information; and
 a webpage 922 including one generated the client application 920 configured to receive a user input to communicate with across a network with other computers or devices.

According to an embodiment, the client may be any device that includes, but is not limited to, a mobile phone, a computer, a tablet computer, a personal digital assistant (PDA) or other mobile device.

Figure 4:
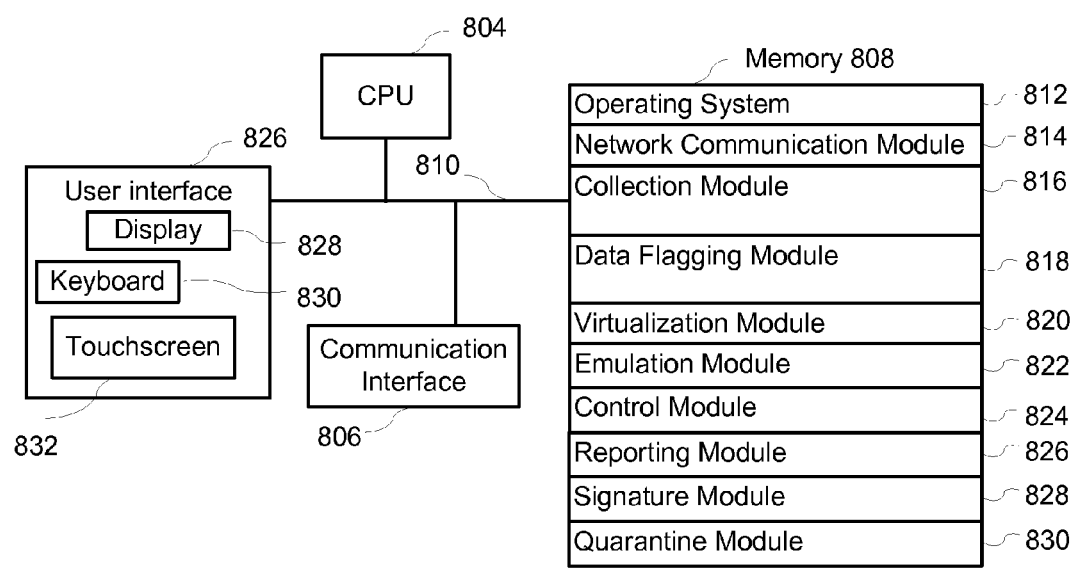
FIG. 4 illustrates an embodiment of a system for detecting malware according to an embodiment.

FIG. 4 illustrates an embodiment of a server, such as a system that implements the methods described herein. The system, according to an embodiment, includes one or more processing units (CPUs) 804, one or more communication interface 806, memory 808, and one or more communication buses 810 for interconnecting these components. The system 802 may optionally include a user interface 826 comprising a display device 828, a keyboard 830, a touchscreen 832, and/or other input/output devices. Memory 808 may include high speed random access memory and may also include non-volatile memory, such as one or more magnetic or optical storage disks. The memory 808 may include mass storage that is remotely located from CPUs 804. Moreover, memory 808, or alternatively one or more storage devices (e.g., one or more nonvolatile storage devices) within memory 808, includes a computer readable storage medium. The memory 808 may store the following elements, or a subset or superset of such elements: an operating system 812, a network communication module 814, a collection module 816, a data flagging module 818, a virtualization module 820, an emulation module 822, a control module 824, a reporting module 826, a signature module 828, and a quarantine module 830. An operating system 812 that includes procedures for handling various basic system services and for performing hardware dependent tasks. A network communication module 814 (or instructions) that is used for connecting the system to other computers, clients, peers, systems or devices via the one or more communication network interfaces 806 and one or more communication networks, such as the Internet, other wide area networks, local area networks, metropolitan area networks, and other type of networks.

A collection module 816 (or instructions) for detecting one or more HTTP objects in a chain of a plurality of HTTP objects, analyze one or more HTTP objects for one or more events, and generating a list of one or more events based on the analysis, determining if one or more HTTP objects includes one or more references to at least a web counter and a web analytic engine, determining one or more vulnerabilities of an application based on a user-agent field in an HTTP object, determining a reputation of a domain name in an HTTP object, determining network information of the HTTP object. Further, the collection module 816 is configured to receive network data (e.g., potentially suspicious data) from one or more sources. Network data is data that is provided on a network from one digital device to another. The collection module 816 may flag the network data as suspicious data based on, for example, whitelists, blacklists, heuristic analysis, statistical analysis, rules, and/or atypical behavior. In some embodiments, the sources comprise data collectors configured to receive network data. For example, firewalls, IPS, servers, routers, switches, access points and the like may, either individually or collectively, function as or include a data collector. The data collector may forward network data to the collection module 816.

In some embodiments, the data collectors filter the data before providing the data to the collection module 816. For example, the data collector may be configured to collect or intercept data that includes executables and batch files. In some embodiments, the data collector may be configured to follow configured rules. For example, if data is directed between two known and trustworthy sources (e.g., the data is communicated between two device on a whitelist), the data collector may not collect the data. In various embodiments, a rule may be configured to intercept a class of data (e.g., all MS Word documents that may include macros or data that may comprise a script). In some embodiments, rules may be configured to target a class of attack or payload based on the type of malware attacks on the target network in the past. In some embodiments, the system may make recommendations (e.g., via the reporting module 826) and/or configure rules for the collection module 816 and/or the data collectors. Those skilled in the art will appreciate that the data collectors may comprise any number of rules regarding when data is collected or what data is collected.

In some embodiments, the data collectors located at various positions in the network may not perform any assessment or determination regarding whether the collected data is suspicious or trustworthy. For example, the data collector may collect all or a portion of the network data and provide the collected network data to the collection module 820 which may perform filtering.

A data flagging module 818 (or instructions) may perform one or more assessments to the collected data received by the collection module 816 and/or the data collector to determine if the intercepted network data is suspicious. The data flagging module 818 may apply rules as discussed herein to determine if the collected data should be flagged as suspicious. In various embodiments, the data flagging module 818 may hash the data and/or compare the data to a whitelist to identify the data as acceptable. If the data is not associated with the whitelist, the data flagging module 818 may flag the data as suspicious.

In various embodiments, collected network data may be initially identified as suspicious until determined otherwise (e.g., associated with a whitelist) or heuristics find no reason that the network data should be flagged as suspicious. In some embodiments, the data flagging module 818 may perform packet analysis to look for suspicious characteristics in the header, footer, destination IP, origin IP, payload, and the like. Those skilled in the art will appreciate that the data flagging module 818 may perform a heuristic analysis, a statistical analysis, and/or signature identification (e.g., signature-based detection involves searching for known patterns of suspicious data within the collected data's code) to determine if the collected network data is suspicious.

The data flagging module 818 may be resident at the data collector, at the system, partially at the data collector, partially at a security server 108, or on a network device. For example, a router may comprise a data collector and a data flagging module 818 configured to perform one or more heuristic assessments on the collected network data. If the collected network data is determined to be suspicious, the router may direct the collected data to the security server 108.

In various embodiments, the data flagging module 818 may be updated. In one example, the security server 108 may provide new entries for a whitelist, entries for a blacklist, heuristic algorithms, statistical algorithms, updated rules, and/or new signatures to assist the data flagging module 818 to determine if network data is suspicious. The whitelists, entries for whitelists, blacklists, entries for blacklists, heuristic algorithms, statistical algorithms, and/or new signatures may be generated by one or more security servers 108 (e.g., via the reporting module 826).

The virtualization module 820 and emulation module 822 may analyze suspicious data for untrusted behavior (e.g., malware or distributed attacks). The virtualization module 820 is configured to instantiate one or more virtualization environments to process and monitor suspicious data. Within the virtualization environment, the suspicious data may operate as if within a target digital device. The virtualization module 820 may monitor the operations of the suspicious data within the virtualization environment to determine that the suspicious data is probably trustworthy, malware, or requiring further action (e.g., further monitoring in one or more other virtualization environments and/or monitoring within one or more emulation environments). In various embodiments, the virtualization module 820 monitors modifications to a system, checks outbound calls, and checks tainted data interactions.

In some embodiments, the virtualization module 820 may determine that suspicious data is malware but continue to process the suspicious data to generate a full picture of the malware, identify the vector of attack, determine the type, extent, and scope of the malware's payload, determine the target of the attack, and detect if the malware is to work with any other malware. In this way, the security server 108 may extend predictive analysis to actual applications for complete validation. A report may be generated (e.g., by the reporting module 826) describing the malware, identify vulnerabilities, generate or update signatures for the malware, generate or update heuristics or statistics for malware detection, and/or generate a report identifying the targeted information (e.g., credit card numbers, passwords, or personal information).

In some embodiments, the virtualization module 820 may flag suspicious data as requiring further emulation and analytics in the back end if the data has suspicious behavior such as, but not limited to, preparing an executable that is not executed, performing functions without result, processing that suddenly terminates, loading data into memory that is not accessed or otherwise executed, scanning ports, or checking in specific potions of memory when those locations in memory may be empty. The virtualization module 820 may monitor the operations performed by or for the suspicious data and perform a variety of checks to determine if the suspicious data is behaving in a suspicious manner.

Further, a virtualization module is configured to instantiate a browser cooking environment such as those described herein.

The emulation module 822 is configured to process suspicious data in an emulated environment. Those skilled in the art will appreciate that malware may require resources that are not available or may detect a virtualization environment. When malware requires unavailable resources, the malware may "go benign" or act in a non-harmful manner. In another example, malware may detect a virtualization environment by scanning for specific files and/or memory necessary for hypervisor, kernel, or other virtualization data to execute. If malware scans portions of its environment and determines that a virtualization environment may be running, the malware may "go benign" and either terminate or perform nonthreatening functions.

In some embodiments, the emulation module 822 processes data flagged as behaving suspiciously by the virtualization environment. The emulation module 822 may process the suspicious data in a bare metal environment where the suspicious data may have direct memory access. The behavior of the suspicious data as well as the behavior of the emulation environment may be monitored and/or logged to track the suspicious data's operations. For example, the emulation module 822 may track what resources (e.g., applications and/or operating system files) are called in processing the suspicious data.

In various embodiments, the emulation module 822 records responses to the suspicious data in the emulation environment. If a divergence in the operations of the suspicious data between the virtualization environment and the emulation environment is detected, the virtualization environment may be configured to inject the response from the emulation environment. The suspicious data may receive the expected response within the virtualization environment and continue to operate as if the suspicious data was within the targeted digital device. The role of the emulation environment and the virtualization environment and the order of using the environments may be swapped.

A control module 824 (or instructions) control module 824 synchronizes the virtualization module 820 and the emulation module 822. In some embodiments, the control module 824 synchronizes the virtualization and emulation environments. For example, the control module 824 may direct the virtualization module 820 to instantiate a plurality of different virtualization environments with different resources. The control module 824 may compare the operations of different virtualization environments to each other in order to track points of divergence. For example, the control module 824 may identify suspicious data as operating in one manner when the virtualization environment includes, but is not limited to, Internet Explorer v. 7.0 or v. 8.0, but operating in a different manner when interacting with Internet Explorer v. 6.0 (e.g., when the suspicious data exploits a vulnerability that may be present in one version of an application but not present in another version).

The control module 824 may track operations in one or more virtualization environments and one or more emulation environments. For example, the control module 824 may identify when the suspicious data behaves differently in a virtualization environment in comparison with an emulation environment. Divergence and correlation analysis is when operations performed by or for suspicious data in a virtual environment is compared to operations performed by or for suspicious data in a different virtual environment or emulation environment. For example, the control module 824 may compare monitored steps of suspicious data in a virtual environment to monitored steps of the same suspicious data in an emulation environment. The functions or steps of or for the suspicious data may be similar but suddenly diverge. In one example, the suspicious data may have not detected evidence of a virtual environment in the emulation environment and, unlike the virtualization environment where the suspicious data went benign, the suspicious data undertakes actions characteristic of malware (e.g., hijacks a formerly trusted data or processes).

When divergence is detected, the control module 824 may re-provision or instantiate a virtualization environment with information from the emulation environment (e.g., a page table including state information and/or response information further described herein) that may not be previously present in the originally instantiation of the virtualization environment. The suspicious data may then be monitored in the new virtualization environment to further detect suspicious behavior or untrusted behavior. Those skilled in the art will appreciate that suspicious behavior of an object is behavior that may be untrusted or malicious. Untrusted behavior is behavior that indicates a significant threat.

In some embodiments, the control module 824 is configured to compare the operations of each virtualization environment in order to identify suspicious or untrusted behavior. For example, if the suspicious data takes different operations depending on the version of a browser or other specific resource when compared to other virtualization environments, the control module 824 may identify the suspicious data as malware. Once the control module 824 identifies the suspicious data as malware or otherwise untrusted, the control module 824 may continue to monitor the virtualization environment to determine the vector of attack of the malware, the payload of the malware, and the target (e.g., control of the digital device, password access, credit card information access, and/or ability to install a bot, keylogger, and/or rootkit). For example, the operations performed by and/or for the suspicious data may be monitored in order to further identify the malware, determine untrusted acts, and log the effect or probable effect.

A reporting module 826 (or instructions) is configured to generate a data model based on a generated list of events. Further a reporting module 826 is configured to generate reports based on the processing of the suspicious data of the virtualization module 820 and/or the emulation module 822. In various embodiments, the reporting module 826 generates a report to identify malware, one or more vectors of attack, one or more payloads, target of valuable data, vulnerabilities, command and control protocols, and/or behaviors that are characteristics of the malware. The reporting module 826 may also make recommendations to safeguard information based on the attack (e.g., move credit card information to a different digital device, require additional security such as VPN access only, or the like).

In some embodiments, the reporting module 826 generates malware information that may be used to identify malware or suspicious behavior. For example, the reporting module 826 may generate malware information based on the monitored information of the virtualization environment. The malware information may include a hash of the suspicious data or a characteristic of the operations of or for the suspicious data. In one example, the malware information may identify a class of suspicious behavior as being one or more steps being performed by or for suspicious data at specific times. As a result, suspicious data and/or malware may be identified based on the malware information without virtualizing or emulating an entire attack.

A signature module 828 (or instructions) is configured to classify said chain of a plurality of hypertext transfer objects based on said list of events. Further a signature module 828 is configured to store signature files that may be used to identify malware. The signature files may be generated by the reporting module 312 and/or the signature module 828. In various embodiments, the security server 108 may generate signatures, malware information, whitelist entries, and/or blacklist entries to share with other security servers. As a result, the signature module 828 may include signatures generated by other security servers or other digital devices. Those skilled in the art will appreciate that the signature module 828 may include signatures generated from a variety of different sources including, but not limited to, other security firms, antivirus companies, and/or other third-parties.

In various embodiments, the signature module 828 may provide signatures which are used to determine if network data is suspicious or is malware. For example, if network data matches the signature of known malware, then the network data may be classified as malware. If network data matches a signature that is suspicious, then the network data may be flagged as suspicious data. The malware and/or the suspicious data may be processed within a virtualization environment and/or the emulation environment as discussed herein.

A quarantine module 830 (or instructions) is configured to quarantine suspicious data and/or network data. In various embodiments, when the security server 108 identifies malware or probable malware, the quarantine module 830 may quarantine the suspicious data, network data, and/or any data associated with the suspicious data and/or network data. For example, the quarantine module 830 may quarantine all data from a particular digital device that has been identified as being infected or possibly infected.

In some embodiments, the quarantine module 830 is configured to alert a security administrator or the like (e.g., via email, call, voicemail, or SMS text message) when malware or possible malware has been found.

Although FIG. 4 illustrates system 802 as a computer it could be distributed system, such as a server system. The figures are intended more as functional descriptions of the various features which may be present in a client and a set of servers than as a structural schematic of the embodiments described herein. As such, one of ordinary skill in the art would understand that items shown separately could be combined and some items could be separated. For example, some items illustrated as separate modules in FIG. 4 could be implemented on a single server or client and single items could be implemented by one or more servers or clients. The actual number of servers, clients, or modules used to implement a system 802 and how features are allocated among them will vary from one implementation to another, and may depend in part on the amount of data traffic that the system must handle during peak usage periods as well as during average usage periods. In addition, some modules or functions of modules illustrated in FIG. 4 may be implemented on one or more one or more systems remotely located from other systems that implement other modules or functions of modules illustrated in FIG. 4.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A system configured to detect malware comprising:
a device on a network to:
  intercept one or more communication packets in transit between a first digital device and a second digital device on the network;
  analyze a payload of at least one of the one or more communication packets;
  detect, based on analyzing the payload, one or more hypertext transfer objects, in a chain of a plurality of hypertext transfer objects, in the payload in transit between the first digital device and the second digital device on the network;
  analyze the one or more hypertext transfer objects for one or more events;
  generate a list of events based on analyzing the one or more hypertext transfer objects;
  determine a score based on at least one of a file format or a header within the one or more hypertext transfer objects;
  determine that the one or more hypertext transfer objects is a suspicious sequence of hypertext transfer objects based on the score satisfying a threshold; and
  instantiate a browser cooking environment based on determining that the one or more hypertext transfer objects is the suspicious sequence of hypertext transfer objects.

2. The system of claim 1, wherein the one or more hypertext transfer objects include a body.

3. The system of claim 2, wherein the device, when analyzing the one or more hypertext transfer objects, is to:
  analyze the one or more hypertext transfer objects by performing a frequency analysis of the body.

4. The system of claim 3, wherein the frequency analysis includes determining a correlation between at least one of:
  a group of special characters,
  a number of language blocks, or
  an entropy calculation.

5. The system of claim 1, wherein the device, when analyzing the one or more hypertext transfer objects, is to:
  analyze the one or more hypertext transfer objects by correlating a unique resource identifier with a body file type.

6. The system of claim 1, wherein the device is further to:
  determine whether the one or more hypertext transfer objects include one or more calls to at least one of a web counter and one or more web analytics engines; and
  wherein the device, when determining that the one or more hypertext transfer objects is the suspicious sequence of hypertext transfer objects, is to:
    determine that the one or more hypertext transfer objects is the suspicious sequence of hypertext transfer objects based on determining that the one or more hypertext transfer objects include the one or more calls.

7. The system of claim 1, wherein the device is further to:
  determine one or more vulnerabilities of an application based on a user-agent field in the header; and
  wherein the device, when determining that the one or more hypertext transfer objects is the suspicious sequence of hypertext transfer objects, is to:
    determine that the one or more hypertext transfer objects is the suspicious sequence of hypertext transfer objects based on determining the one or more vulnerabilities.

8. The system of claim 1, wherein the device is further to:
determine a reputation of a domain name in the one or more hypertext transfer objects, and
wherein the device, when determining that the one or more hypertext transfer objects is the suspicious sequence of hypertext transfer objects, is to:
determine that the one or more hypertext transfer objects is the suspicious sequence of hypertext transfer objects based on determining the reputation.

9. The system of claim 1, wherein the device is further to:
determine network information of the one or more hypertext transfer objects,
the network information including at least one of an Internet protocol address or a port number; and
wherein the device, when determining that the one or more hypertext transfer objects is the suspicious sequence of hypertext transfer objects, is to:
determine that the one or more hypertext transfer objects is the suspicious sequence of hypertext transfer objects based on determining the network information.

10. The system of claim 1, wherein the device is further to:
generate a data model based on the list of events.

11. The system of claim 1, wherein the device is further to:
classify the chain of the plurality of hypertext transfer objects based on the list of events.

12. The system of claim 1, wherein the device is further to:
generate a data model based on the list of events; and
classify the of the plurality of hypertext transfer objects chain based on the data model.

13. A non-transitory computer-readable medium storing instructions, the instructions comprising:
one or more instructions that, when executed by one or more processors, cause one or more processors to:
intercept one or more communication packets in transit between a first digital device and a second digital device on a network;
analyze a payload of at least one of the one or more communication packets;
detect, based on analyzing the payload, one or more hypertext transfer objects, in a chain of a plurality of hypertext transfer objects, in the payload in transit between the first digital device and the second digital device on the network;
analyze the one or more hypertext transfer objects for one or more events;
generate a list of events based on analyzing the one or more hypertext transfer objects;
determine a score based on at least one of a file format or a header within the one or more hypertext transfer objects; and
determine that the one or more hypertext transfer objects is a suspicious sequence of hypertext transfer objects based on the score satisfying a threshold.

14. A method, comprising:
intercepting, by a device, one or more communication packets in transit between a first digital device and a second digital device on a network;
analyzing, by the device, a payload of at least one of the one or more communication packets;
detecting, by the device and based on analyzing the payload, one or more hypertext transfer objects, in a chain of a plurality of hypertext transfer objects, in the payload in transit between the first digital device and the second digital device on the network;
analyzing, by the device, the one or more hypertext transfer objects for one or more events;
generating, by the device, a list of events based on analyzing the one or more hypertext transfer objects;
determining, by the device, a score based on at least one of a file format or a header within the one or more hypertext transfer objects; and
determining, by the device, that the one or more hypertext transfer objects is a suspicious sequence of hypertext transfer objects based on the score satisfying a threshold.

15. The method of claim 14, wherein the one or more hypertext transfer objects includes a body.

16. The method of claim 15, wherein analyzing the one or more hypertext transfer objects includes:
analyzing the one or more hypertext transfer objects by performing a frequency analysis of the body.

17. The method of claim 16, wherein performing the frequency analysis includes:
determining a correlation between at least one of:
a group of special characters,
a number of language blocks, or
an entropy calculation.

18. The method of claim 14, wherein analyzing the one or more hypertext transfer objects includes:
correlating a unique resource identifier with a body file type.

19. The method of claim 14, further comprising:
determining whether the one or more hypertext transfer objects include one or more references to at least one of a web counter and one or more web analytics engines; and
wherein determining that the one or more hypertext transfer objects is the suspicious sequence of hypertext transfer objects comprises:
determining that the one or more hypertext transfer objects is the suspicious sequence of hypertext transfer objects based on determining that the one or more hypertext transfer objects include the one or more references.

20. The method of claim 14, further comprising:
determining one or more vulnerabilities of an application based on a user-agent field in the header; and
wherein determining that the one or more hypertext transfer objects is the suspicious sequence of hypertext transfer objects comprises:
determining that the one or more hypertext transfer objects is the suspicious sequence of hypertext transfer objects based on determining the one or more vulnerabilities.

21. The method of claim 14, further comprising:
determining a reputation of a domain name in the one or more hypertext transfer objects; and
wherein determining that the one or more hypertext transfer objects is the suspicious sequence of hypertext transfer objects comprises:
determining that the one or more hypertext transfer objects is the suspicious sequence of hypertext transfer objects based on determining the reputation.

22. The method of claim 14, further comprising,
determining network information of the one or more hypertext transfer objects,
the network information including at least one of an Internet protocol address or a port number; and wherein determining that the one or more hypertext transfer objects is the suspicious sequence of hypertext transfer objects comprises:
  determining that the one or more hypertext transfer objects is the suspicious sequence of hypertext transfer objects based on determining the network information.

23. The method of claim 14, further comprising:
generating a data model based on the list of events.

24. The method of claim 14, further comprising:
classifying the chain of the plurality of hypertext transfer objects based on the list of events.

25. The method of claim 14, further comprising:
generating a data model based on the list of events; and
classifying the chain based on the data model.

* * * * *